(12) United States Patent
Dalal

(10) Patent No.: US 7,345,896 B2
(45) Date of Patent: Mar. 18, 2008

(54) SECONDARY SIDE POWER SUPPLY CONTROLLER AND METHOD THEREFOR

(75) Inventor: Dhaval Dalal, Phoenix, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 185 days.

(21) Appl. No.: 10/841,330

(22) Filed: May 10, 2004

(65) Prior Publication Data

US 2005/0248964 A1 Nov. 10, 2005

(51) Int. Cl.
*H02M 3/335* (2006.01)
*H02M 7/217* (2006.01)

(52) U.S. Cl. ............... 363/21.14; 363/127; 323/902

(58) Field of Classification Search ......... 363/21.14, 363/21.12, 21.15, 21.18, 21.06, 21.13, 21.16, 363/21.17, 902, 21.07–21.08, 79, 80, 89, 363/127
See application file for complete search history.

(56) References Cited

U.S. PATENT DOCUMENTS

| | | | | |
|---|---|---|---|---|
| 5,303,138 A | * | 4/1994 | Rozman | 363/21.06 |
| 5,920,475 A | * | 7/1999 | Boylan et al. | 363/127 |
| 5,956,245 A | * | 9/1999 | Rozman | 363/89 |
| 5,991,171 A | * | 11/1999 | Cheng | 363/21.03 |
| 5,999,420 A | * | 12/1999 | Aonuma et al. | 363/21.06 |
| 6,069,804 A | * | 5/2000 | Ingman et al. | 363/21.14 |
| 6,101,104 A | * | 8/2000 | Eng | 363/21.06 |
| 6,198,638 B1 | * | 3/2001 | Lee | 363/21.14 |
| 6,373,727 B1 | * | 4/2002 | Hedenskog et al. | 363/21.14 |
| 6,400,583 B1 | * | 6/2002 | Lau | 363/21.13 |
| 6,418,039 B2 | | 7/2002 | Lentini et al. | |
| 6,473,317 B1 | * | 10/2002 | Simopoulos | 363/21.06 |
| 6,490,183 B2 | * | 12/2002 | Zhang | 363/89 |
| 6,535,400 B2 | * | 3/2003 | Bridge | 363/21.06 |
| 6,813,166 B1 | * | 11/2004 | Chang et al. | 363/21.14 |

OTHER PUBLICATIONS

Abraham Pressman, Switching and Linear Power Supply, Power Converter Design, 1988, Hayden Book Company, printing 9, pp. 12-13.*
STMicroelectronics Data Sheet, Sep. 2003, "STSR30, Synchronous Rectifiers Smart Driver for Flyback", pp. 1-10, Copyright 2004 STMicroelectronics.

* cited by examiner

*Primary Examiner*—Jeffrey Sterrett
*Assistant Examiner*—Harry Behm
(74) *Attorney, Agent, or Firm*—Robert F. Hightower

(57) ABSTRACT

In one embodiment, a power supply controller generates a PWM control signal that is subsequently used to control a portion of current flow in a primary side of a power supply system. THE PWM control signal is coupled to a secondary of the power supply system and used to control a synchronous rectifier that is coupled within the secondary side.

14 Claims, 5 Drawing Sheets

SECONDARY SIDE POWER SUPPLY CONTROLLER AND METHOD THEREFOR

BACKGROUND OF THE INVENTION

The present invention relates, in general, to electronics, and more particularly, to methods of forming semiconductor devices and structure.

In the past, various circuits and methods were utilized to control synchronous rectifiers in power supply systems. Usually, the control methods depended on the operating mode and the type of power supply system. Flyback type power supply systems usually required complex control circuits. In a flyback converter, the synchronous rectifier typically was in the secondary side of the power supply system and the switching power supply controller was in the primary side of the power supply system. One method utilized a fixed frequency clock to predict the time in which the synchronous rectifier should be enabled or disabled. An example of such a flyback system was disclosed in U.S. pat. No. 6,418,039 issued to Franco Lentini et al on Jul. 9, 2002. Complicated circuitry was required to implement the control. The complicated circuitry increased the system cost. Additionally, it was difficult to accurately predict the proper time to enable and disable the synchronous rectifier, thus, the operation was inefficient.

Accordingly, it is desirable to have a control method and circuit that accurately controls a secondary side synchronous rectifier, that does not require complicated circuitry, and that has low cost.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
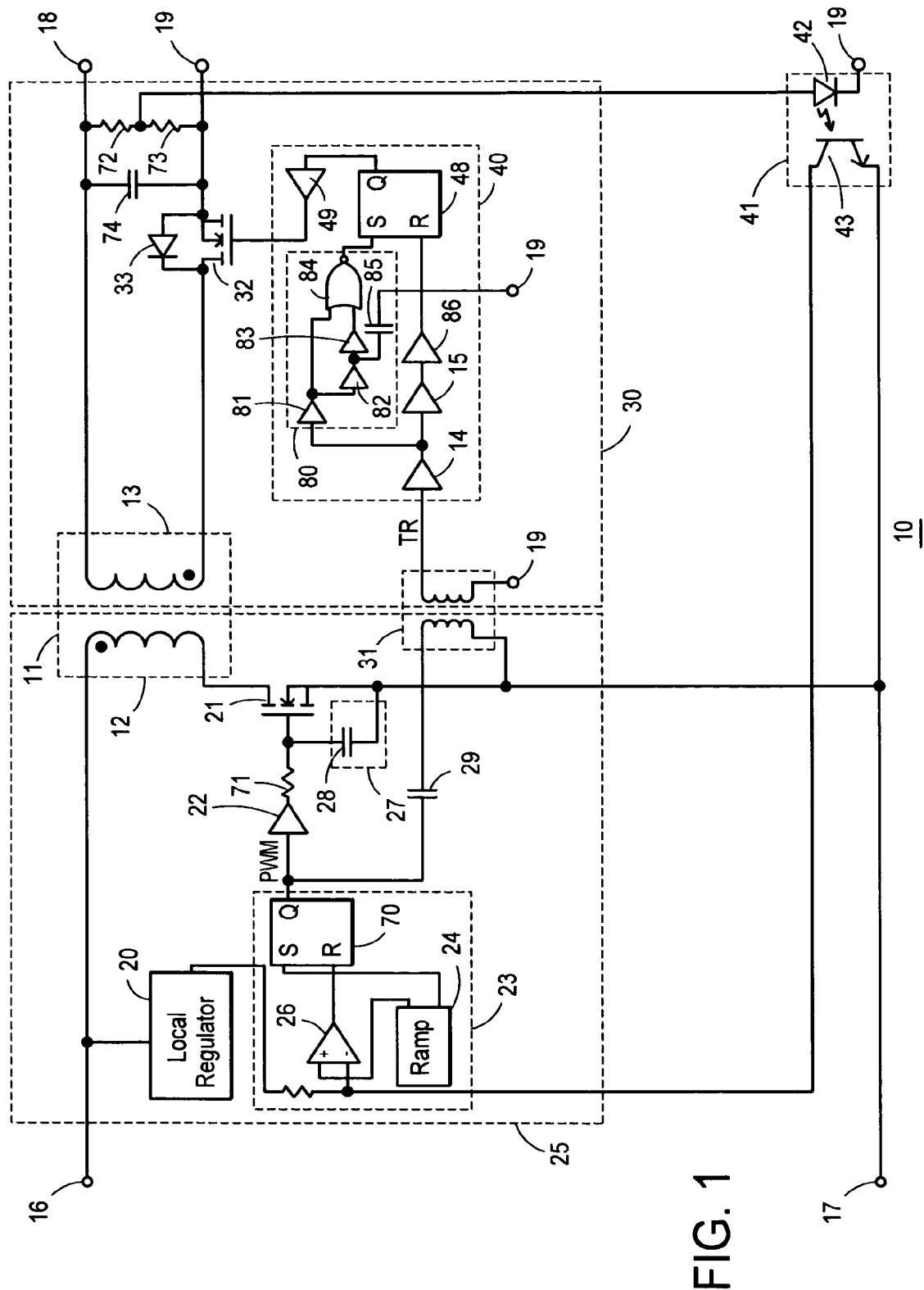
FIG. 1 schematically illustrates a portion of an embodiment of a power supply system in accordance with the present invention.

FIG. 1 schematically illustrates an embodiment of a portion of a power supply system 10 that includes a secondary side power supply controller 40. Controller 40 utilizes a PWM control signal from a primary side of system 10 in order to control a synchronous rectifier of the secondary side of system 10. Power supply system 10 includes a transformer 11 that has a primary side inductor 12 and a secondary side inductor 13. Typically, elements connected to primary side inductor 12 are electrically isolated from elements connected to secondary side inductor 13. Consequently, system 10 is regarded as having a primary side 25 that is electrically isolated from a secondary side 30. System 10 receives power between a power input 16 and a power return 17, and generates an output voltage between an output terminal 18 and an output common terminal 19. System 10 controls the current flow through primary side inductor 12 in order to regulate the value of the output voltage formed between terminals 18 and 19. A power switch is connected to primary side inductor 12 in order to control the amount of current and the timing of the current flowing through inductor 12. In the preferred embodiment, the power switch is a power metal oxide semiconductor (MOS) transistor 21. In other embodiments the power switch may be a bipolar transistor or other element that is well known to those skilled in the art. A switching controller within primary side 25 is utilized to create a control signal to control the power switch and the current flow through inductor 12. Typically, the switching controller is a pulse width modulated (PWM) controller 23 that includes a ramp generator or ramp 24, a PWM comparator 26, and a PWM latch 70. Ramp 24 has a first output that generates a clock signal and a second output that generates a ramp signal. The clock signal from ramp 24 is used to set PWM latch 70. Comparator 26 receives the ramp signal from ramp 24 and also receives a feedback signal that is representative of the value of the output voltage formed between terminals 18 and 19. The output of comparator 26 resets latch 70. Controller 23 generates a PWM control signal that is utilized to control transistor 21. The output of latch 70, thus, the output of controller 23 forms the PWM control signal which is labeled as PWM in FIG. 1. Such PWM controllers are well known to those skilled in the art. A driver 22 receives the PWM control signal from controller 23. A delay element 27 is connected to the output of driver 22 to create a delay between the PWM control signal from controller 23 and the signal used to drive transistor 21. Thus, the signal used to drive transistor 21 is referred to as a delayed PWM drive signal. The delay element can be a capacitor and resistor, such as a capacitor 28 and a resistor 71, although other elements may be utilized to create the delayed PWM drive signal. In some embodiments, the gate capacitance of transistor 21 may be sufficient to provide the desired delay. Primary side 25 generally includes a local regulator 20 that generates an operating voltage to operate elements within primary side 25, including PWM controller 23 and driver 22. Although not shown for clarity of the drawings, local regulator 20 is connected between input 16 and return 17 to receive power.

Secondary side 30 includes another MOS transistor 32 connected to function as a synchronous rectifier in series with inductor 13. A diode 33 represents the body diode of transistor 32. Secondary side 30 also includes secondary side power supply controller 40 that assists in enabling and disabling transistor 32.

System 10 also includes an energy storage capacitor 74 and an optical coupler 41 that is used to generate the feedback signal for PWM controller 23. Optical coupler 41 has a light emitting diode 42 connected to receive the output voltage. Typically, a voltage divider, such as the voltage divider formed by resistors 72 and 73, is used to reduce the voltage from terminals 18 and 19 prior to applying the voltage to coupler 41. Coupler 41 also includes a phototransistor 43 and that receives light from diode 42 and responsively generates the feedback signal that is received by controller 23. Because of the optical coupling between diode 42 and phototransistor 43, diode 42 and phototransistor 43 are typically regarded as being electrically isolated from each other. As connected in FIG. 1, diode 42 is a portion of secondary side 30 and phototransistor 43 is a portion of primary side 25. System 10 also includes a signal isolation device 31 that is used to couple the PWM control signal from primary side 25 to secondary side 30 as a trigger signal (TR) that is representative of the PWM control signal. Device 31 typically is a signal transformer having a primary side connected to receive the PWM control signal and a secondary side to which the PWM control signal is coupled through the magnetic coupling of the transformer. Device 31 may also be other types of signal isolation and coupling elements such as an optical coupler. A capacitor 29 is coupled in series between the output of controller 23 and the input of device 31 in order to provide a true ac signal at the input of the signal transformer.

When a power supply system is operating in the continuous conduction mode, it is often difficult to determine the appropriate time in which to disable the synchronous rectifier. Controller 40 is formed to use the PWM control signal from primary side 25 to assist in disabling the synchronous rectifier in order more efficiently to control transistor 32. Controller 40 is formed to receive a signal representative of the PWM control signal and responsively begin disabling the synchronous rectifier. Controller 40 includes a latch 48, a receiver 14, buffers 15 and 86, a pulse stretcher circuit or pulse stretcher 80, and a driver 49. In most embodiments, driver 49 is formed to have a drive capacity sufficient to enable and disable transistor 32 in an efficient and timely manner. In some cases, an external driver may be required in addition to driver 49. Receiver 14 receives a trigger (TR) signal from device 31 and responsively generates a logic signal for use by controller 40. Pulse stretcher 80 stretches and inverts the width of the trigger (TR) signal to provide timing control to assist in controlling transistor 32 to turn-on after transistor 21 begins turning-off as will be seen further hereinafter. Stretcher 80 includes an input buffer 81, a delay buffer 82, a delay buffer 83, a delay capacitor 85, and a NOR gate 84.

When the output of controller 23 goes high to enable transistor 21, the high going PWM control signal from the output of latch 70 and controller 23 is coupled through device 31. The corresponding TR signal is received by receiver 14 forcing the output high of receiver 14 high. Since the output of receiver 14 was previously low, the output of stretcher 80 is high and latch 48 is set, thus, transistor 32 is enabled. The high from receiver 14 forces the output of buffer 81 high and the output of gate 84 low releasing the set input of latch 48. In parallel, the high from receiver 14 forces the output of buffers 15 and 86 high to reset latch 48. Typically, the delay of buffers 15 and 86 is selected so that the output of stretcher 80 and the set input of latch 48 go low before buffers 15 and 86 force the reset input of latch high. The low Q output of latch 48 is received by driver 49 which responsively begins disabling transistor 32. Referring back to primary side 25, because of the delay from delay element 27 the gate of transistor 21 does not go high until a first time period after the PWM control signal goes high. This first time period typically is chosen to ensure that the delayed PWM drive signal applied to transistor 21 does not begin enabling transistor 21 until controller 40 has begun disabling transistor 32. The first time period may be greater in order to minimize the amount of overlap between both transistors 21 and 32 being enabled in order to reduce shoot-through currents and optimize the efficiency of system 10. Typically the first time period is about fifty to one thousand nano-seconds (50-1000 nsec) and preferably is about one hundred fifty nano-seconds (150 nsec).

When the output of controller 23 goes low to disable transistor 21, the low going PWM control signal is coupled through device 31 as the TR signal which forces the output of receiver 14 low. The low from receiver 14 forces the output of buffers 15 and 86 and the corresponding reset of input of latch 48 low. The low from receiver 14 also forces the output of buffer 81 low which has no effect on gate 84 and latch 48 since the output of buffer 83 is still low. The low from buffer 81 is received by buffer 82 which responsively begins driving the output of buffer 82 low. However, capacitor 85 slows the output signal from buffer 82 by a delay time that is sufficient to allow transistor 21 to turn-off prior to the input of buffer 83 going low. Once the input to buffer 83 goes low, the low propagates through buffer 83 and forces the output of gate 84 high to set latch 48. The high going Q output is received by driver 49 which responsively drives the output of driver 49 high and begins enabling transistor 32 and discharging inductor 13. It will be appreciated by those skilled in the art, that the PWM control signal can be used to create an alternate enable control signal, typically inverted from the PWM control signal, and that this alternate enable signal may be coupled to secondary side 30 and used to enable transistor 32.

In order to implement this functionality for system 10, a first terminal of primary inductor 12 is connected to input 16 and to an input of regulator 20. A second terminal of inductor 12 is connected to a drain of transistor 21. A source of transistor 21 is connected to a first terminal of capacitor 28, to a first terminal of device 31, and to return 17. A gate of transistor 21 is connected to a second terminal of capacitor 28 and to a first terminal of resistor 71. A second terminal of resistor 71 is connected to an output of driver 22. An input of driver 22 is connected to the Q output of latch 70 and to a first terminal of capacitor 29. Second terminal of capacitor 29 is connected to a second terminal of device 31. A set input of latch 70 is connected to a clock output of ramp 24 and a reset input of latch 70 is connected to the output of comparator 26. A non-inverting input of comparator 26 is connected to the ramp output of ramp 24. An inverting input of comparator 26 is connected through a resistor to an output of regulator 20 and to a collector of coupler 41. An emitter of coupler 41 is connected to return 17. A trigger input of controller 40 is connected to a third terminal of device 31 and to the input of receiver 14. A fourth terminal of device 31 is connected to terminal 19. An output of receiver 14 is connected to an input of buffer 81 and to an input of buffer 15. An output of buffer 15 is connected to an input of buffer 86. The reset input of latch 48 is connected to an output of buffer 86. An output of Buffer 81 is connected to a first input of gate 84 and to an input of buffer 82. An output of buffer 82 is connected to a first terminal of capacitor 85 and to an input of buffer 83. An output of buffer 83 is connected to a second input of gate 84. An output of gate 84 is connected to a set input of latch 48. A Q output of latch 48 is connected to an input of driver 49 which has an output connected to a gate of transistor 32. A source of transistor 32 is connected to terminal 19 and to an anode of diode 33. The drain of transistor 32 is connected to a cathode of diode 33 into a first terminal of inductor 13. A second terminal of inductor 13 is connected to output terminal 18. An anode of coupler 41 is connected to a first terminal of both resistors 72 and 73, and a cathode is connected to terminal 19. A second terminal of resistor 72 is connected to terminal 18 and a second terminal of resistor 73 is connected to terminal 19. An anode of diode 33 is connected to the source of transistor 32 and a cathode is connected to the drain of transistor 32.

Figure 2:
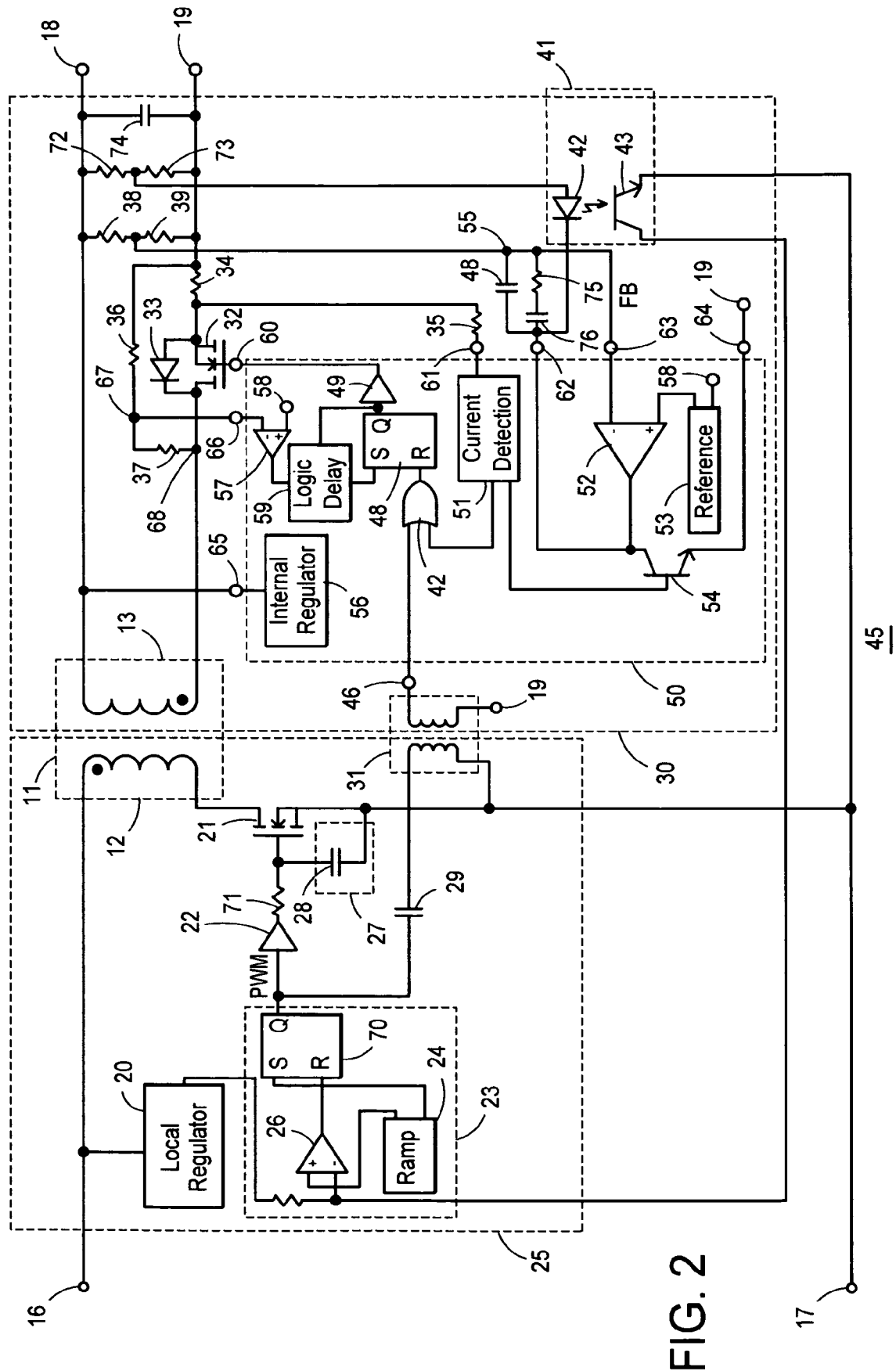
FIG. 2 schematically illustrates a portion of an alternate embodiment of the power supply system of FIG. 1 in accordance with the present invention.

FIG. 2 schematically illustrates an embodiment of a portion of a power supply system 45 that is an alternate embodiment to power supply system 10 that was explained in the description of FIG. 1. System 45 includes a secondary side controller 50 that is an alternate embodiment to controller 40 that was explained in the description of FIG. 1. Controller 50 is formed to control the operation of the synchronous rectifier for various operating modes of system 45 including the dis-continuous operating mode, the critical conduction operating mode, and the continuous conduction operating mode. Controller 50 includes latch 48 and driver 49, an OR gate 47, a current detection circuit 51, a feedback amplifier 52, a protection clamp transistor 54, a reference generator or reference 53, a comparator 57, and a logic and delay circuit 59. Reference 53 has two outputs that generate two different reference voltages that are used by controller 50. Controller 50 also typically includes an internal regulator 56 that supplies an operating voltage for operating the elements within controller 50.

System 45 includes a current sense resistor 34 connected in series between terminal 19 and the source of transistor 32, and a pair of divider resistors 36 and 37 connected in parallel across transistor 32 and resistor 34. A synchronization node 67 formed at a common connection between resistors 36 and 37 provides a synchronization signal that is utilized by controller 50 to facilitate enabling the synchronous rectifier functionality that is provided by transistor 32. Controller 50 is formed to utilize the synchronization signal provided by resistors 36 and 37 to determine the appropriate time for enabling transistor 32 instead of using the control signal that was utilized by controller 40 (FIG. 1). A synchronization input 66 of controller 50 receives the synchronization signal from resistors 36 and 37. Resistor 34 is used provide a current sense functionality for controller 50 as will be seen further hereinafter. Controller 50 typically has eight terminals including synchronization input 66, a trigger input 46 that receives the TR signal, a voltage input 65 that receives an input voltage from system 45, a drive output 60 that provides a drive signal for controlling transistor 32, a current sense input 61, a compensation terminal 62, a secondary feedback input 63, and a common return terminal 64. Terminal 64 typically is connected to terminal 19. Controller 50 also generally includes an internal regulator 56 that provides an operating voltage for the elements of controller 50. Although not shown for clarity of the drawings, regulator 56 is connected between input 65 and terminal 64.

When operating in the continuous conduction mode, the PWM control signal output of controller 23 goes high and is coupled through device 31 to input 46 of controller 50 as the TR signal. The high going TR signal is received by gate 47 and responsively forces the output of gate 47 high to reset latch 48. The low from latch 48 is received by driver 49 which drives the gate of transistor 32 low to begin disabling transistor 32. In primary side 25, the high going PWM control signal from controller 23 is also received by driver 22. Due to delay element 27, driver 22 and element 27 delay enabling transistor 21 for the first time period. After the first time period, the delayed PWM drive signal begins enabling transistor 21 and the resulting current flow through primary inductor 12 develops a voltage across secondary inductor 13.

At a subsequent time, the output of controller 23 goes low, the low going PWM control signal is coupled through device 31 to the input of gate 47. Gate 47 receives the low going The TR signal forcing the output of gate 47 low releasing the reset input and latch 48 remains set. Element 27 and driver 22 delay the PWM control signal to subsequently form the delayed PWM drive signal which begins disabling transistor 21. As transistor 21 is disabled, the voltage across inductor 13 decreases, thus, the voltage across resistors 36 and 37 also decreases thereby reducing the value of the synchronization signal at node 67. If the voltage at an inductor node 68 falls below the value of the reverse voltage of diode 33, diode 33 would begin conducting. Comparator 57 receives the synchronization signal on an inverting input and receives a first reference voltage from a first output 58 of reference 53 on a non-inverting input. When the value of the synchronization signal has decreased below a first voltage value, the output of comparator 57 goes high. The high from comparator 57 is gated by circuit 59 to prevent noise or voltage ringing from prematurely re-enabling latch 48 and transistor 32. AS will be seen further hereinafter, circuit 59 prevents the output of comparator 57 from setting latch 48 for a second time period after it has been reset. If the output of comparator 57 goes high after the second time period, the output of circuit 59 goes high and sets latch 48. The high from latch 48 is received by driver 49 forcing the output of driver 49 high to begin enabling transistor 32. The first value is chosen to be sufficient high to substantially prevent reverse conduction through diode 33 prior to beginning to turn-on transistor 32 and sufficiently low to prevent noise or ringing from prematurely enabling transistor 32. The first value typically is between about one and twenty milli-volts (1-20 mV) and preferably is about ten milli-volts (10 mV) greater than the voltage of terminal 64.

When system 45 is operating in either the dis-continuous operating mode or the critical conduction operating mode, the duty cycle of transistor 21 is low and the current flow through transistor 32 goes to nearly zero for each cycle of PWM controller 23. When the current nears zero or approximately zero, the current through resistor 34 also nears zero and the current on current sense input 61 of controller 50 also nears zero. Current detection circuit 51 detects that the current is near zero which forces a first output of circuit 51 high. The high from circuit 51 is received by gate 47 which forces the output of gate 47 high and resets latch 48. The low from latch 48 is received by driver 49 which responsively begins disabling transistor 32. Thus, in both the dis-continuous and critical conduction operating modes, controller 50 senses that current flow through transistor 32 is near zero and disables transistor 32. The value of current at which circuit 51 facilitates controller 50 beginning to disable transistor 32 is controlled by the value of resistors 34 and 35 and some portions of circuit 51. Typically, a value of current between about one and five (1-5) micro-amps will force the output of circuit 51 high. If the current flow through transistor 32 is not near zero when controller 23 generates the PWM control signal, then controller 50 utilizes the TR signal to begin disabling transistor 32 as described hereinbefore.

In some cases, it is desirable to have a feedback error amplifier as part of the secondary side of power supply system 45. Feedback amplifier 52 and the second output of reference 53 facilitate forming a secondary side error processing circuit for the output voltage. A resistor 38 and a resistor 39 are connected as a voltage divider between terminals 18 and 19 in order to form a secondary feedback signal at a feedback (FB) node 55 between resistors 38 and 39. Amplifier 52 receives both the secondary feedback signal from feedback input 63 and the second reference voltage from the second output of reference 53, and responsively provides an error voltage on an output of amplifier 52. The output of amplifier 52 and the corresponding error voltage are connected to terminal 62 of controller 50. Capacitor 76 and resistor 75 are connected in series between terminal 62 and node 55 to form a compensation network for the feedback processing control loop. A capacitor 44 connected between terminal 62 and node 55 is a portion of the compensation network. Transistor 54 is connected to the output of amplifier 52 as a voltage clamp to limit the energy during an overload condition. If the current sense signal across resistor 34 exceeds an upper current limit, circuit 51 senses the over current condition and a second output of circuit 51 goes high to enable transistor 54 in order to clamp the voltage on the output of amplifier 52 to a value near zero.

In order to implement the functionality of controller 50, the source of transistor 32 is connected to a first terminal of resistor 34 instead of being connected to terminal 19 as was explained in the description of FIG. 1. The second terminal of resistor 34 is connected to terminal 19. A first terminal of resistor 35 is connected to the first terminal of resistor 34 and to the source of transistor 32. A second terminal of resistor 35 is connected to input 61 and to the input of circuit 51. A first terminal of both resistors 38 and 72 is connected to terminal 18, and a first terminal of both resistors 39 and 73 is connected to terminal 19. A second terminal of both resistors 38 and 39 is connected to node 55 and to input 63. A second terminal of both resistors 72 and 73 is connected to the anode of diode 42. The cathode of diode 42 is connected to terminal 62. A first terminal of both resistors 36 and 37 is connected to node 67, to input 66 and to an inverting input of comparator 57. A second terminal of resistor 37 is connected to the drain of transistor 32 and to node 68, and a second terminal of resistor 36 is connected to terminal 19. The input of circuit 51 is connected to input 61, and the first output of circuit 51 is connected to a first input of gate 47. A second input of gate 47 is connected to input 46 and to the third terminal of device 31. An output of gate 47 is connected to the reset input of latch 48. The second output of circuit 51 is connected to a base of transistor 54. An emitter of transistor 54 is connected to terminal 64, and a collector of transistor 54 is connected to the output of amplifier 52 and to terminal 62. An inverting input of comparator 57 is connected to first output 58 of reference 53. An output of comparator 57 is connected to a first input of circuit 59. A second input of circuit 59 is connected to the Q output of latch 48 and the output of circuit 59 is connected to the set input of latch 48. A first terminal of capacitor 44 is connected to node 55 and to a first terminal of resistor 73. A second terminal of resistor 73 is connected to a first terminal of capacitor 76. A second terminal of capacitor 76 is connected to terminal 62.

Figure 3:
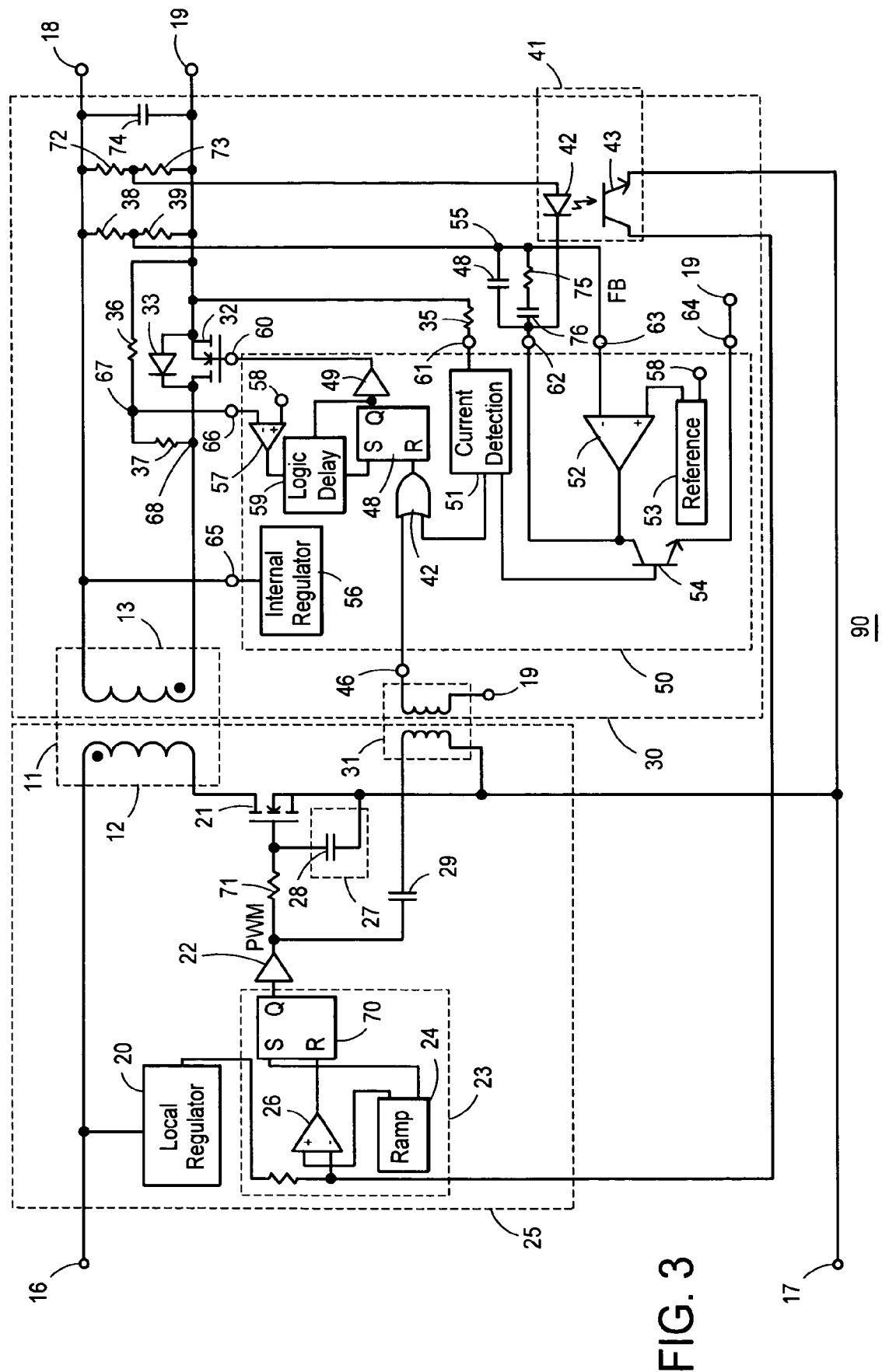
FIG. 3 schematically illustrates a portion of another alternate embodiment of the power supply system of FIG. 1 in accordance with the present invention.

FIG. 3 schematically illustrates a portion of an embodiment of a power supply system 90 that is an alternate embodiment of system 45 explained in the description of FIG. 2. In some cases, it may not be possible to access the input of driver 22. Thus the output of driver 22 may be used to connect the PWM control signal to device 31. Additionally, the on-resistance of transistor 32 is used to form the current sense signal, thus, resistor 34 of FIG. 2 is removed and resistor 35 is connected to the drain of transistor 32. The on-resistance of transistor 32 replaces resistor 34. It should be noted that the synchronization signal received on input 66 can be alternatively generated from the current sense signal received on input 61, thus eliminating the need for resistors 36 and 37. The current sense signal can be copied through a current mirror and the output of the current mirror can be coupled to a resistor to convert the current to a voltage that is applied to comparator 57.

Figure 4:
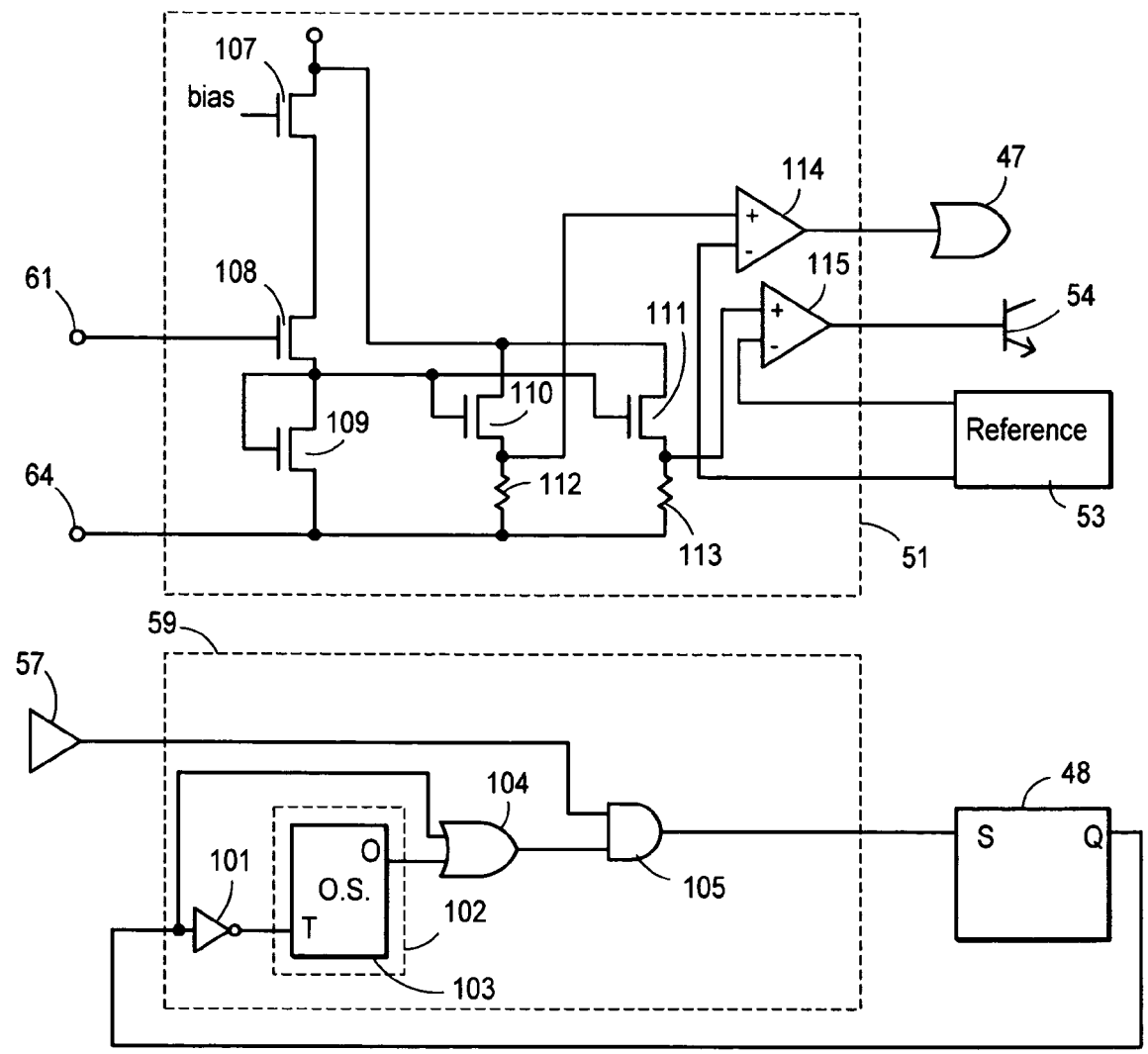
FIG. 4 schematically illustrates a portion of an embodiment of a current detection circuit and logic delay circuit of FIG. 2 and FIG. 3 in accordance with the present invention.

FIG. 4 schematically illustrates a portion of an embodiment of circuit 51 and circuit 59 that are explained in the discussion of FIG. 2. Circuit 51 and circuit 59 may be implemented by many different circuit configurations, thus, the example implementations illustrated in FIG. 4 are examples of a circuit to implement the functions of circuit 51 and a circuit to implement the functions of circuit 59. The current on input 61 is received by a current mirror that includes transistors 108, 109, 110, and 111 along with voltage conversion resistors 112 and 113. The current from input 61 is mirrored to flow through resistors 112 and 113 which convert the current to a voltage. The voltage across resistors 112 and 113 are received by respective comparators 114 and 115. Comparator 114 also receives a reference voltage that sets the value at which the first output of circuit 51 goes high to begin disabling transistor 32. Comparator 115 also receives a reference voltage that sets the value at which the second output of circuit 51 goes high to begin enabling transistor 54.

Circuit 59 gates the output of comparator 57 to prevent noise form enabling transistor 32. When latch 48 is reset, the low from the Q output is received by an inverter 101. The output of inverter 101 triggers a delay block 102 forcing the output high for the second time period. The high from block 102 is supplied to the first input of an OR gate 104. A second input to gate 104 is supplied by the Q output of latch 48. An output of gate 104 is a signal that is always low for the second time period after the Q output of latch 48 has gone low. The output of gate 104 supplies the first input of gate 105, which forces the output of gate 105 low regardless of the value received from comparator 57 during the second time period. After the second time period, the output of gate 104 goes high allowing the output of comparator 57 to pass through gate 105 and control the set input of latch 48. Delay block 102 could be a variety of delay elements such as a one-shot 103.

Figure 5:
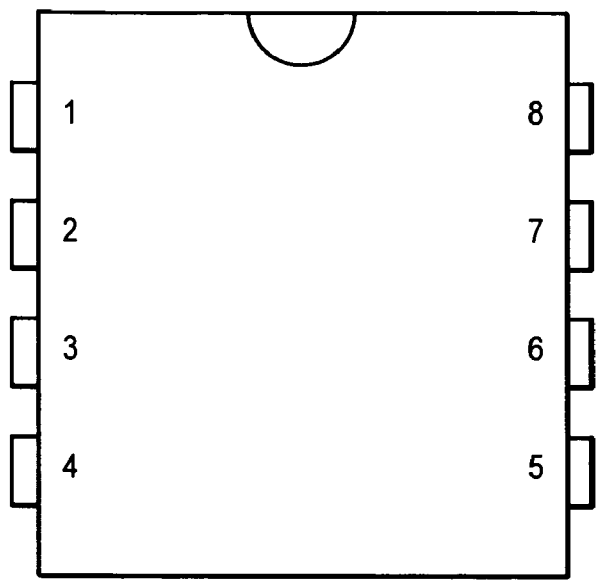
FIG. 5 schematically illustrates an enlarged plan view of a portion of an embodiment of a semiconductor package in accordance with the present invention.

FIG. 5 schematically illustrates an enlarged plan view of a portion of an embodiment of a semiconductor package 92 into which controller 40 of FIG. 1 or controller 50 of FIG.2 and FIG. 3 may be assembled and packaged.

Figure 6:
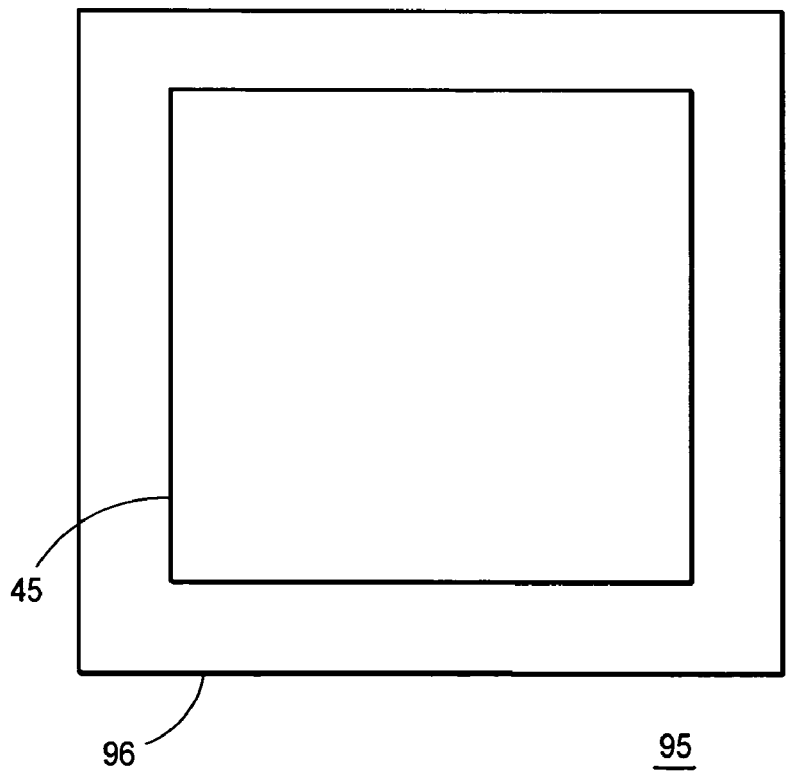
FIG. 6 schematically illustrates a semiconductor die on which portion of the power supply system of FIG. 1 is formed in accordance with the present invention.

FIG. 6 schematically illustrates an enlarged plan view of a portion of an embodiment of a semiconductor device 95 that is formed on a semiconductor die 96. Controller 50 is formed on die 96. Die 96 may also include other circuits that are not shown in FIG. 3 for simplicity of the drawing. Controller 40 may be formed on die 96 instead of controller 50. Controller 50 and device 95 are formed on die 96 by semiconductor manufacturing techniques that are well known to those skilled in the art.

In view of all of the above, it is evident that a novel device and method is disclosed. Included, among other features, is using a signal representative of the primary side PWM control signal to control a synchronous rectifier in a secondary side of a power supply system. Using the primary side PWM control signal provides greater accuracy and control of enabling and disabling the synchronous rectifier thereby improving efficiency and minimizing body diode conduction through the substrate. Using the primary side PWM control signal also reduces the complexity and costs of the controller and system that uses the controller.

While the invention is described with specific preferred embodiments, it is evident that many alternatives and variations will be apparent to those skilled in the semiconductor arts. Additionally, the word "connected" is used throughout for clarity of the description, however, it is intended to have the same meaning as the word "coupled". Accordingly, "connected" should be interpreted as including either a direct connection or an indirect connection such as an electrical element may be interposed between two specified terminals or signals that are coupled together.

The invention claimed is:

1. A method of controlling a flyback power supply comprising:
   coupling a first power switch to a secondary side of a transformer of the flyback power supply, wherein the first power switch is coupled in series with a secondary side inductor of the transformer;
   coupling a second power switch on a primary side of the transformer to control at least a portion of current flow through a primary side inductor of the transformer;
   configuring a power supply controller to form a PWM control signal;
   coupling the PWM control signal to the second power switch to control the second power switch;
   coupling the PWM control signal from the primary side of the flyback power supply to the secondary side of the flyback power supply through an element other than the transformer to form a control signal that is representative of the PWM control signal and using the control signal to control the first power switch wherein the control signal enables the first power switch responsively to disabling the second power switch; and
   configuring the first switch to be disabled responsively to any one of the control signal, a value of an output voltage that is formed by the flyback power supply, and to sensing current flow in the secondary side of the flyback power supply decreasing to a first value.

2. The method of claim 1 wherein coupling the PWM control signal from the primary side of the flyback power supply to the secondary side of the flyback power supply includes using the first power switch to control at least a portion of current flow through the secondary side inductor of the transformer.

3. The method of claim 1 wherein coupling the PWM control signal to the second power switch includes delaying the PWM control signal before applying the PWM control signal to the second power switch.

4. The method of claim 3 wherein delaying the PWM control signal includes delaying the PWM control signal at least until beginning to disable the first power switch.

5. The method of claim 3 further including using the delayed PWM control signal to control the second power switch.

6. The method of claim 1 wherein coupling the PWM control signal from the primary side of the flyback power supply includes coupling the PWM control signal through a signal isolation device and using an output of the signal isolation device to control the first power switch.

7. The method of claim 1 further including using a voltage at a drain of the first power switch to begin enabling the first power switch.

8. A method of forming a secondary side power supply controller comprising:
   coupling a first power switch in series with a secondary side inductor of a transformer of the flyback power supply;
   coupling a second power switch on a primary side of the transformer to control at least a portion of current flow through a primary side inductor of the transformer;
   configuring a primary side power supply controller to form a PWM control signal;
   coupling the PWM control signal to a control electrode of the second power switch to control the second power switch;
   coupling the PWM control signal from the primary side to the secondary side through one of a signal transformer or an optical coupler to form a control signal that is representative of the PWM control signal;
   configuring the secondary side power supply controller to receive the control signal and to use the control signal to begin enabling the first power switch responsively to disabling the second power switch; and
   configuring the secondary side power supply controller to begin disabling the first switch responsively to any one of the control signal, a value of an output voltage that is formed by the secondary side power supply controller, and to sensing current flow in the secondary side decreasing to a first value.

9. The method of claim 8 wherein configuring the secondary side power supply controller to receive the control signal and to use the control signal includes receiving the control signal and responsively begin disabling the first power switch.

10. The method of claim 9 wherein disabling the first power switch includes disabling a synchronous rectifier.

11. The method of claim 8 further including forming the secondary side power supply controller to responsively begin disabling the first power switch when current through the first power switch decreases to a value that is near zero.

12. The method of claim 8 further including forming the secondary side power supply controller to receive a synchronization signal representative of voltage coupled to the secondary side and to responsively enable the first power switch prior to the voltage coupled to the secondary side decreasing to approximately a first value that causes reverse conduction through a body diode of the first power switch.

13. A secondary side power supply controller comprising:
   a flyback coupled transformer of a flyback power supply having a primary side inductor and a secondary side inductor;
   a PWM controller configured to form a PWM control signal;
   a first power switch coupled to the primary side inductor of the transformer, the first power switch coupled to receive the PWM control signal for controlling the first power switch;
   one of a signal transformer or an optical coupler configured to couple the PWM control signal from the primary side to the secondary side as a control signal that is representative of the PWM control signal;
   a single power switch coupled in series with the secondary side inductor to control at least a portion of current through the secondary side inductor;
   a trigger input operable to receive the control signal and use the control signal for enabling the single power switch responsively to disabling the first power switch; and a control circuit operable to generate a disable signal to disable the single power switch responsively to any one of the control signal, a value of an output voltage that formed by the secondary side power supply controller, and to to sensing current flow in the secondary side decreasing to a first value.

14. The secondary side power supply controller of claim 13 further including a driver operable to enable and disable the single power switch.

* * * * *